(12) United States Patent
Anasori et al.

(10) Patent No.: US 12,322,799 B2
(45) Date of Patent: Jun. 3, 2025

(54) RARE EARTH ELEMENT MXenes AND METHODS OF MAKING THEREOF

(71) Applicant: The Trustees of Indiana University, Bloomington, IN (US)

(72) Inventors: Babak Anasori, Fishers, IN (US); Weichen Hong, Indianapolis, IN (US)

(73) Assignee: The Trustees of Indiana University, Bloomington, IN (US)

(*) Notice: Subject to any disclaimer, the term of this patent is extended or adjusted under 35 U.S.C. 154(b) by 32 days.

(21) Appl. No.: 17/497,003

(22) Filed: Oct. 8, 2021

(65) Prior Publication Data

US 2022/0112582 A1 Apr. 14, 2022

Related U.S. Application Data

(60) Provisional application No. 63/089,811, filed on Oct. 9, 2020.

(51) Int. Cl.
| | |
|---|---|
| *C22C 29/02* | (2006.01) |
| *C01B 32/907* | (2017.01) |
| *C22C 1/05* | (2023.01) |
| *C22C 1/051* | (2023.01) |
| *C22C 1/06* | (2006.01) |
| *H01M 4/58* | (2010.01) |

(52) U.S. Cl.
CPC ............. *H01M 4/58* (2013.01); *C01B 32/907* (2017.08); *C22C 1/051* (2013.01); *C22C 1/058* (2013.01); *C22C 1/06* (2013.01); *C22C 29/02* (2013.01); *C01P 2002/72* (2013.01); *C01P 2002/77* (2013.01); *C01P 2002/85* (2013.01); *C01P 2002/88* (2013.01); *C01P 2004/03* (2013.01); *C01P 2004/04* (2013.01); *C01P 2004/24* (2013.01); *C01P 2006/40* (2013.01); *C22C 2202/02* (2013.01)

(58) Field of Classification Search
CPC ...................................................... C22C 29/02
See application file for complete search history.

(56) References Cited

U.S. PATENT DOCUMENTS

2022/0112582 A1  4/2022  Anasori et al.

OTHER PUBLICATIONS

Iqbal, Mehroz, et al. "Co-existence of magnetic phases in two-dimensional MXene." Materials Today Chemistry 16 (2020): 100271.*
Champagne, Aurélie, et al. "Insights into the elastic properties of RE-i-MAX phases and their potential exfoliation into two-dimensional RE-i-MXenes." Physical Review Materials 4.1 (2020): 013604.*

(Continued)

*Primary Examiner* — Christopher S Kessler
(74) *Attorney, Agent, or Firm* — Taft Stettinius & Hollister LLP

(57) ABSTRACT

A composition of matter defined by the general formula of $M_{2+x}L_{1-x}X_2$, wherein: X is carbon; M represents a transition metal selected from the group consisting of Ti, Ta, Sc, Cr, Zr, Mo, V, and Nb; and L represents a lanthanide element selected from the group consisting of Ce, Pr, Nd, Sm, Gd, Tb, Dy, Ho, Er, Tm, Yb, and Lu.

12 Claims, 4 Drawing Sheets

(56) References Cited

OTHER PUBLICATIONS

Rafiq, Sunaina, et al. "Novel room-temperature ferromagnetism in Gd-doped 2-dimensional Ti3C2Tx MXene semiconductor for spintronics." Journal of Magnetism and Magnetic Materials 497 (2020): 165954.*

Lu et al., "Two predicted two-dimensional BCN structures: A first-principles study" 6 pages. Physica E: Low-dimensional Systems and Nanostructures. vol. 125, No. 114413. 2021.

Kilic et al., "Emerging exotic properties of two-dimensional ternary tetrahexagonal BCN: Tunable anisotropic transport properties with huge excitonic effects for nanoelectronics and optoelectronics" 8 pages. Materials Today Physics. vol. 27, No. 100792. 2022.

Gao et al., "Theoretical screening of 2D materials supported transition-metal single atoms as efficient electrocatalysts for hydrogen evolution reaction" 7 pages. Materialia. vol. 18, No. 101168. 2021.

Helmer et al., "Investigation of 2D Boridene from First Principles and Experiments" 11 pages. Advanced Functional Materials. vol. 32, No. 2109060. 2022.

Nair et al., "2D MBenes: A Novel Member in the Flatland" 14 pages. Advanced Functional Materials. vol. 34, vol. 2108840. 2022.

Jin et al., "Exploration of two-dimensional molybdenum-borides and potential applications" 7 pages. npj 2D Materials and Applications. vol. 6 No. 49. 2022.

Hu et al., "Solubility of Boron, Carbon, and Nitrogen in Transition Metals: Getting Insight into Trends from First-Principles Calculations" 6 pages. The Journal of Physical Chemistry Letters. vol. 6 2015.

Kent et al., "Bulletin of the American Physical Society" 1 page. APS March Meeting 2022. 2022.

Zhou et al., "Boridene: Two-dimensional Mo4/3B2-x with ordered metal vacancies obtained by chemical exfoliation" 6 pages. 2D Materials. vol. 373. 2021.

Khazaei et al., "Novel MAB phases and insights into their exfoliation into 2D MBenes" 10 pages. 2019.

Surucu, "Investigation of structural, electronic, anisotropic elastic, and lattice dynamical properties of MAX phases borides: An Ab-initio study on hypothetical M2AB (M=Ti, Zr, Hf; A =Al, Ga, In) compounds" 12 pages. Materials Chemistry and Physics. vol. 203. 2018.

Li et al., "Single-Metal Atoms Supported on MBenes for Robust Electrochemical Hydrogen Evolution" 7 pages. ACS Applied Materials & Interfaces. vol. 12. 2020.

Yang et al., "MBenes: emerging 2D materials as efficient electrocatalysts for the nitrogen reduction reaction" 10 pages. Royal Society of Chemistry. vol. 5. 2020.

Nemani et al., "High-Entropy 2D Carbide MXenes: TiVNbMoC3 and TiVCrMoC3" 11 pages. ACS Nano. 2021.

* cited by examiner

US 12,322,799 B2

RARE EARTH ELEMENT MXenes AND METHODS OF MAKING THEREOF

RELATED APPLICATIONS

The present application claims priority to U.S. Provisional Application Ser. No. 63/089,811, filed on Oct. 9, 2020, the entire disclosure of which being hereby expressly incorporated herein by reference.

GOVERNMENT RIGHTS

This invention was made with government support under 2124478 awarded by National Science Foundation. The Government has certain rights in the invention.

TECHNICAL FIELD

Aspects of this disclosure relate to magnetic materials. More specifically, embodiments relate to two-dimensional materials capable of room-temperature magnetism.

BACKGROUND

Magnetic materials have uses in various applications ranging from optoelectronics, semiconductor devices, quantum computation, spintronics, magnetoelectronics, and enhance medical imaging. Of the new magnetic materials, two-dimensional (2D) solids are of particular interest at least due to their scalability. Having a new family of 2D structures with a wide range of chemistries can provide a source of materials for various applications.

BRIEF SUMMARY OF THE DISCLOSURE

According to one embodiment, the present disclosure provides a composition of matter defined by the general formula of $M_{2+v}L_{1-v}X_2$, wherein: X is carbon; M represents a transition metal selected from the group consisting of Ti, Ta, Sc, Cr, Zr, Mo, V, and Nb; and L represents a lanthanide element selected from the group consisting of Ce, Pr, Nd, Sm, Gd, Tb, Dy, Ho, Er, Tm, Yb, and Lu. In one aspect of this embodiment, M is Mo. In yet another aspect of this embodiment, L is Nd. In yet another aspect of this embodiment, the composition is a MXene. In yet another aspect of this embodiment, the v is smaller than 0.5. In yet another aspect of this embodiment, the composition is produced by at least: preparing precursor MAX phase powder; etching the MAX phase powder to obtain multi-layered MXene powder; and delaminating the multi-layered MXene powder to obtain single-to-few-layered MXene flakes. In another aspect of this embodiment, preparing precursor MAX phase powder includes mixing and reactive sintering elemental powders of transition metal M and lanthanide element L with Al and M:L:Al:C in 2.5:0.5:1.1:2 or 2.5:0.5:1.3:2 stoichiometric ratio to obtain one or more sintered MAX phase blocks. In another aspect of this embodiment, preparing precursor MAX phase powder further includes milling the one or more sintered MAX phase blocks to obtain the MAX phase powder. In another aspect of this embodiment, etching the MAX phase powder includes adding the MAX phase powder into an aqueous hydrofluoric acid to selectively etch away Al to obtain multi-layered MXene powder. In another aspect of this embodiment, delaminating the multi-layered MXene powder includes delaminating the multi-layered MXene powder using tetramethylammonium hydroxide (TMAOH). In another aspect of this embodiment, delaminating the multi-layered MXene powder further includes filtering MXene from TMAOH to obtain the single-to-few-layered MXene flakes.

According to one embodiment, the present disclosure provides a method of producing a composition of matter defined by the general formula of $M_{2+v}L_{1-v}X_2$, the method comprising: preparing precursor MAX phase powder; etching the MAX phase powder to obtain multi-layered MXene powder; and delaminating the multi-layered MXene powder to obtain single-to-few-layered MXene flakes having the general formula of $M_{2+v}L_{1-v}X_2$, wherein: X is carbon; M represents a transition metal selected from the group consisting of Ti, Ta, Sc, Cr, Zr, Mo, V, and Nb; and L represents a lanthanide element selected from the group consisting of Ce, Pr, Nd, Sm, Gd, Tb, Dy, Ho, Er, Tm, Yb, and Lu. In one aspect of this embodiment, M is Mo. In yet another aspect of this embodiment, L is Nd. In yet another aspect of this embodiment, the v is smaller than 0.5. In another aspect of this embodiment, preparing precursor MAX phase powder includes mixing and reactive sintering elemental powders of transition metal M and lanthanide element L with Al and M:L:Al:C in 2.5:0.5:1.1:2 or 2.5:0.5:1.3:2 stoichiometric ratio to obtain one or more sintered MAX phase blocks. In another aspect of this embodiment, preparing precursor MAX phase powder further includes milling the one or more sintered MAX phase blocks to obtain the MAX phase powder. In another aspect of this embodiment, etching the MAX phase powder includes adding the MAX phase powder into an aqueous hydrofluoric acid to selectively etch away Al to obtain multi-layered MXene powder. In another aspect of this embodiment, delaminating the multi-layered MXene powder includes delaminating the multi-layered MXene powder using tetramethylammonium hydroxide (TMAOH). In another aspect of this embodiment, delaminating the multi-layered MXene powder further includes filtering MXene from TMAOH to obtain the single-to-few-layered MXene flakes.

According to one embodiment, the present disclosure provides a composition of matter defined by the general formula of $M_{2+v}L_{1-v}AX_2$, wherein: X is carbon; A is aluminum; M represents a transition metal selected from the group consisting of Ti, Ta, Sc, Cr, Zr, Mo, V, and Nb; and L represents a lanthanide element selected from the group consisting of Ce, Pr, Nd, Sm, Gd, Tb, Dy, Ho, Er, Tm, Yb, and Lu.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The figures described herein are for illustration purposes only. The figures are not intended to limit the scope of the present disclosure.

DETAILED DESCRIPTION OF THE DISCLOSURE

Figure 1:
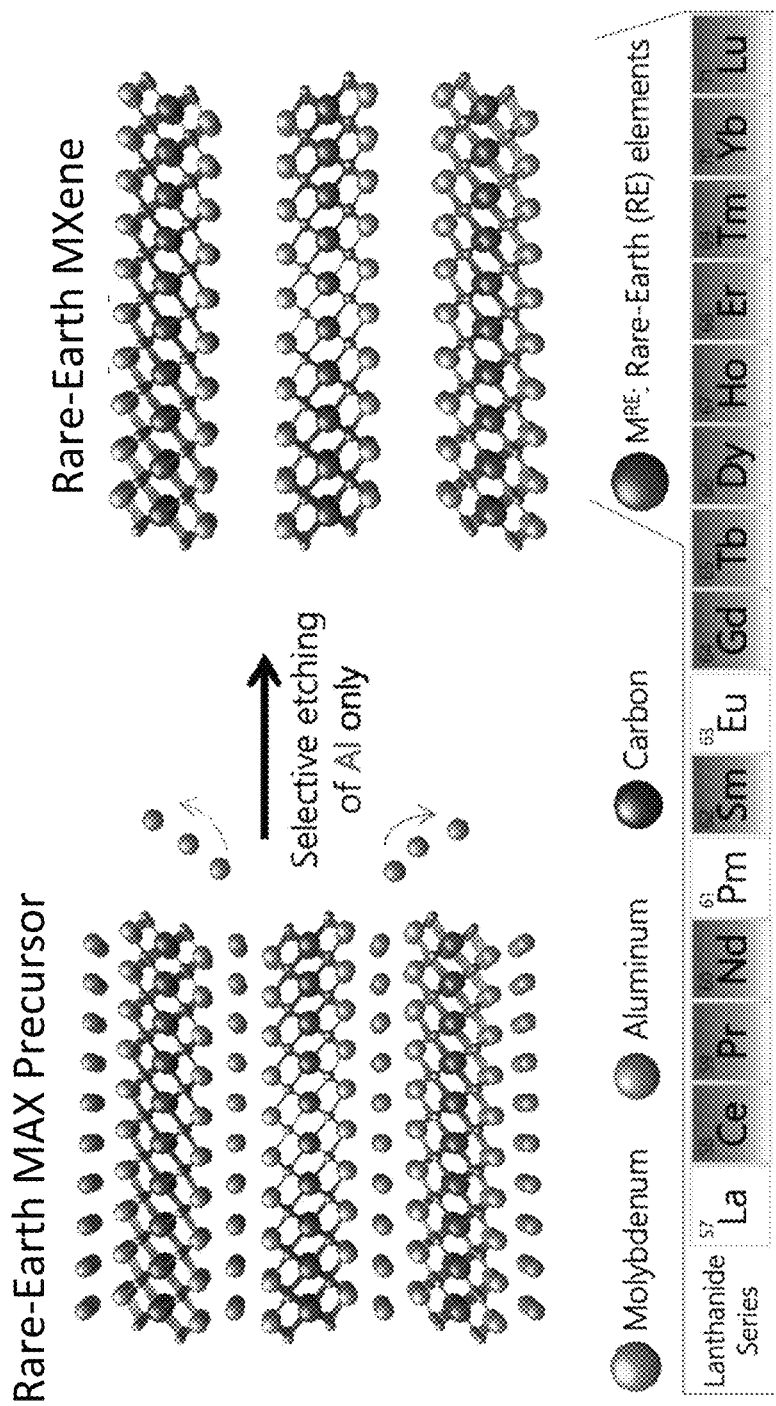
FIG. 1 is a simplified schematic showing selective etching of rare-earth MAX precursor to obtain rare-earth MXene, in accordance with embodiments of the disclosure.

While the disclosed subject matter is amenable to various modifications and alternative forms, specific embodiments have been shown by way of example in the drawings and are described in detail below. The intention, however, is not to limit the subject matter disclosed herein to the particular embodiments described. On the contrary, the disclosure is intended to cover all modifications, equivalents, and alternatives falling within the scope of the subject matter disclosed herein, and as defined by the appended claims.

Aspects of the present disclosure relate to MXenes. MXenes may refer to 2D transition metal carbines and nitrides having n+1 (e.g., n=1 to 4) atomic layers of transition metals interleaved by carbon and/or nitrogen layers. MXenes may be described as having a chemical formula of $M_{n+1}X_nT_x$ (n=1 to 4), where a 2D MXene flake may be comprised of n+1 atomic layers of transition metals (M) from groups 3 to 6 of the periodic table interleaved by a layer of carbon and/or nitrogen (X) between the M layers. For example, transition metal may be Sc, Ti, V, Cr, Y, Zr, Nb, Mo, Hf, or Ta. In addition, the outer transition metal atomic layers may be bonded to surface terminations (T), such as —O, —F, and —OH. MXenes may exhibit superior metallic electrical conductivity, high in-plane mechanical stiffness, and impressive catalytic as well as electrochemically active behavior. MXenes may be synthesized from their precursors, the MAX phases, by selective etching of the A layers which may be from group 13-16 of the periodic table, such as Al.

Aspects of the present disclosure relate to synthesis of rare-earth MXenes (RE-MXene) and synthesis of rare-earth MXene precursors of layered rare-earth MAX (RE-MAX) carbides. Specifically, aspects of the present disclosure relate to two-dimensional (2D) carbide MXenes including a rare-earth element, such as $Mo_2NdC_2$ and $Mo_{2.5}Nd_{0.5}C_2$. Additionally, aspects of the present disclosure relate to precursor MAX phases including a rare-earth element, such as $Mo_{2.5}Nd_{0.5}Al_{1.1}C_2$. Various rare-earth elements may be incorporated into RE-MXenes and/or RE-MAX carbides according to the present disclosure, including Ce, Pr, Nd, Sm, Gd, Tb, Dy, Ho, Er, Tm, Yb, and Lu.

Aspects of the present disclosure relate to synthesis of $M_3C_2$ and $M_4C_3$ RE-MXenes, in which the rare-earth elements are located within the $M_3C_2$ and $M_4C_3$ atomic planes not susceptible to selective etching more than the transition metals. Specifically, RE-MAX phases with $M_3AlC_2$ and $M_4AlC_3$ structures where the rare earth elements occupy the non-surface M-layers of $M_3C_2$ and $M_4C_3$ may help keep rare earth elements from being etched and as a result, create RE-MXenes. RE-MXenes prepared using methods of the present disclosure may have the general formula of $(LM)_4X_3$ or $(LM)_3X_2$ wherein L is a lanthanide element selected from the group consisting of Ce, Pr, Nd, Sm, Gd, Tb, Dy, Ho, Er, Tm, Yb, and Lu, and M is a transition metal selected from the group consisting of Sc, Ti, V, Cr, Y, Zr, Nb, Mo, Hf, or Ta, and X is carbon. In various examples, M is selected to be Mo. In various examples, X is selected to be C.

Aspects of the present disclosure relate to synthesis of double transition metal (DTM) RE-MAX carbides. For example, DTM RE-MAX carbides may have the general formula of $M_3AC_2$ or $M_4AC_3$, where one or more of M1, M2, M3, and M4 may be a transition metal selected from Sc, Ti, V, Cr, Y, Zr, Nb, Mo, Hf, or Ta, with the remaining being selected to be a rare-earth element selected from Ce, Pr, Nd, Sm, Gd, Tb, Dy, Ho, Er, Tm, Yb, and Lu. In various examples, A is aluminum. As examples, DTM RE-MAX carbides prepared according to methods of the present disclosure may include $Mo_{2+v}Nd_{1-v}AlC_2$, $Mo_{2+v}Gd_{1-v}AlC_2$, and $Mo_{2+v}Nd_{2+v}AlC_2$. In various examples, the rare earth elements are within the 3 or 4 layers of the $M_{n+1}C_n$ (n=2, 3) of the MAX phases. As a result, the MXene selective etching process does not remove rare earth elements from the structures during synthesis of RE-MXenes.

A method of synthesizing RE-MXene according to the present disclosure includes synthesizing layered RE-MAX carbides (e.g., $Mo_{2.5}Nd_{0.5}AlC_2$), and exfoliating and delaminating the layered RE-MAX carbides to obtain RE-MXenes (e.g., $Mo_2NdC_2$ and $Mo_{2.5}Nd_{0.5}C_2$). RE-MXenes prepared according to methods of the present disclosure may exhibit room temperature magnetism, which may be used in magnetoelectronics and electromagnetic interference shielding, enhanced medical imaging, and quantum computation.

A method of synthesizing RE-MAX carbides may include reactive sintering of elemental powders, which includes mixing a rare-earth element metal with a transition metal with Al and C, reactive sintering the powders to obtain sintered blocks of the RE-MAX carbides, and milling the sintered blocks of RE-MAX carbides to obtain fine powders of the RE-MAX carbides. Reactive sintering may be performed in a tube furnace with the powder mixtures placed in alumina crucibles and by heating the powder mixtures from room temperature to 1600° C. at 3° C./min in a tube furnace and holding time of 1-6 hours under argon atmosphere. The RE-MAX carbide blocks may next be milled into RE-MAX carbide powders.

To obtain RE-MXene, etching of the RE-MAX carbide powders may be performed, such as using an aqueous hydrofluoric acid (HF) etching process. First, the sintered RE-MAX carbide powders may be added into 48% HF for four days at 55° C. to selectively etch Al atomic layers from the RE-MAX carbides (FIG. 1) followed by repeated washing to a neutral pH. After etching, the method of synthesizing RE-MXene further includes delaminating the exfoliated RE-MXenes into single flakes of 2D MXenes, such as using tetramethylammonium hydroxide (TMAOH).

Figures 2A, 2B, 2C:
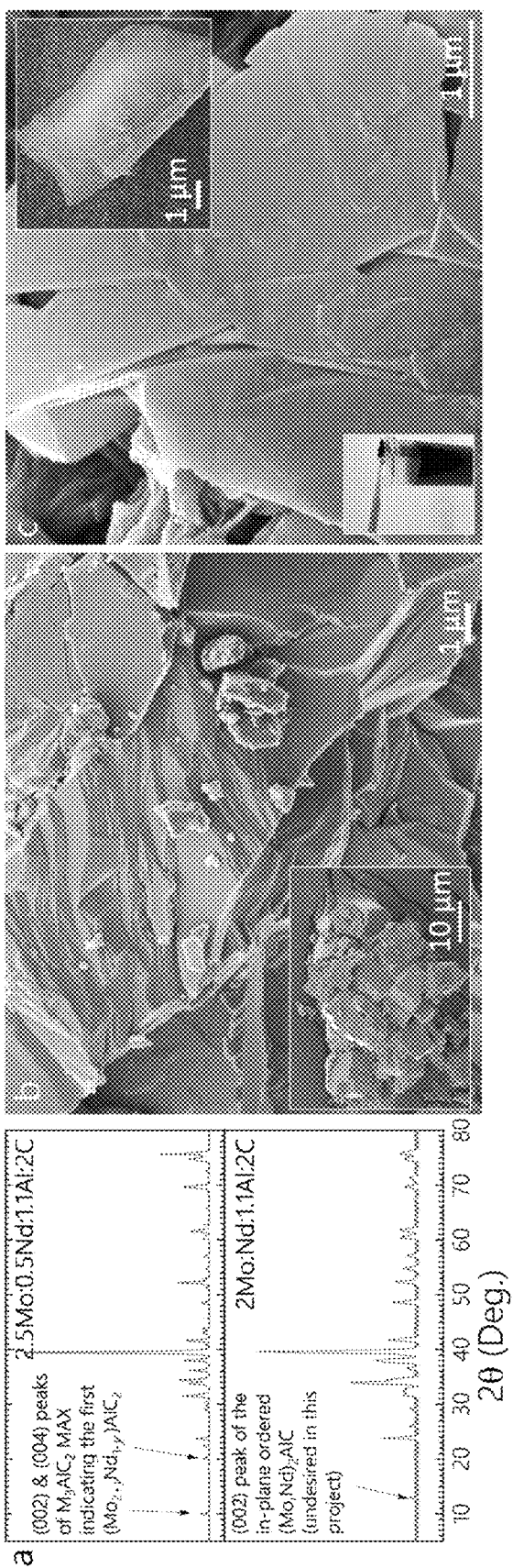
FIG. 2A shows XRD patterns of two powder mixtures of Mo:Nd:Al:C 2.5:0.5:1.1:2 and 2:1:1.1:2, in accordance with embodiments of the disclosure.
FIG. 2B shows layered $Mo_{2+v}Nd_{1-v}AlC_2$ MAX carbide powder, in accordance with embodiments of the disclosure.
FIG. 2C shows flakes of $Mo_{2+y}Nd_{1-y}C_2T_x$ MXene, in accordance with embodiments of the disclosure.

In accordance with methods of the present disclosure for preparing RE-MAX carbides, powders in ratios of 2Mo:1Nd:1.1Al:2C and 2.5Mo:0.5Nd:1.1Al:2C are mixed and reactive-sintered (e.g., at 1600° C. for 1-6 hours). X-ray diffraction (XRD) may be used to analyze the sintered powders to verify the formation of RE-MAX carbides. As shown in FIG. 2A, a slight change of Mo:Nd from 2:1 to 2.5:0.5 leads to the formation of two different MAX phases. When a Mo:Nd 2:1 ratio is used, the resulting MAX phase indicates an in-plane ordered $M_2AlC$ phase, which may be less desirable for the synthesis of MXenes. However, when a Mo:Nd 2.5:0.5 ratio is used, the resulting MAX phase indicates a $M_3AlC_2$ having a $Mo_{2+v}Nd_{1-v}AlC_2$ structure. Using more than stoichiometric ratio molybdenum may be required to form an ordered $M_3AlC_2$ RE-MAX phase. FIG. 2B shows a scanning electron microscope (SEM) image of the resulting RE-MAX carbide powder $Mo_{2.2}Nd_{0.7}Al_{1.0}C_2$, according to energy dispersive X-ray spectroscopy (EDS)

data, which is in the expected range of a $Mo_2NdAlC_2$ structure. The insert in FIG. 2B shows cubic impurities that may be removed prior to further processing into RE-MXene powder.

In accordance with methods of the present disclosure for preparing RE-MXenes, RE-MAX carbide powders may be etched using HF to selectively remove Al from the synthesized $M_2LAlC_2$ and $M_3L_2AlC_3$ to make RE-MXenes. As an example, FIG. 2C shows RE MXene flakes obtained via selective HF etching RE-MAX carbide powder $Mo_{2.2}Nd_{0.7}Al_{1.0}C_2$. The EDS results on the collected flakes (FIG. 2C) indicate a qualitative atomic ratio of the Mo:Nd 2.0±0.4:0.7±0.3 along with carbon and oxygen, which indicates a RE-MXene formation of $Mo_{2+y}Nd_{1-y}C_2T_x$.

Figure 3:
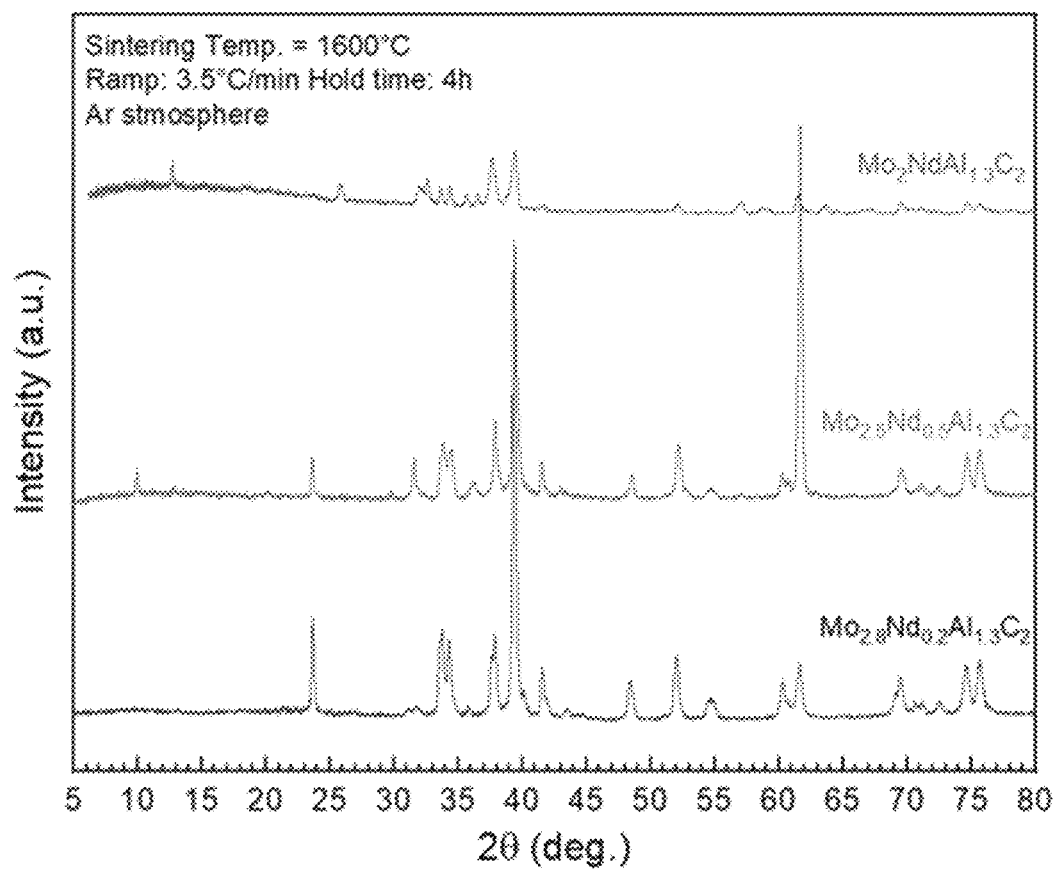
FIG. 3 shows XRD patterns of variants of $Mo_{2+v}Nd_{1-v}AlC_2$ carbides, in accordance with embodiments of the disclosure.
Figure 4:
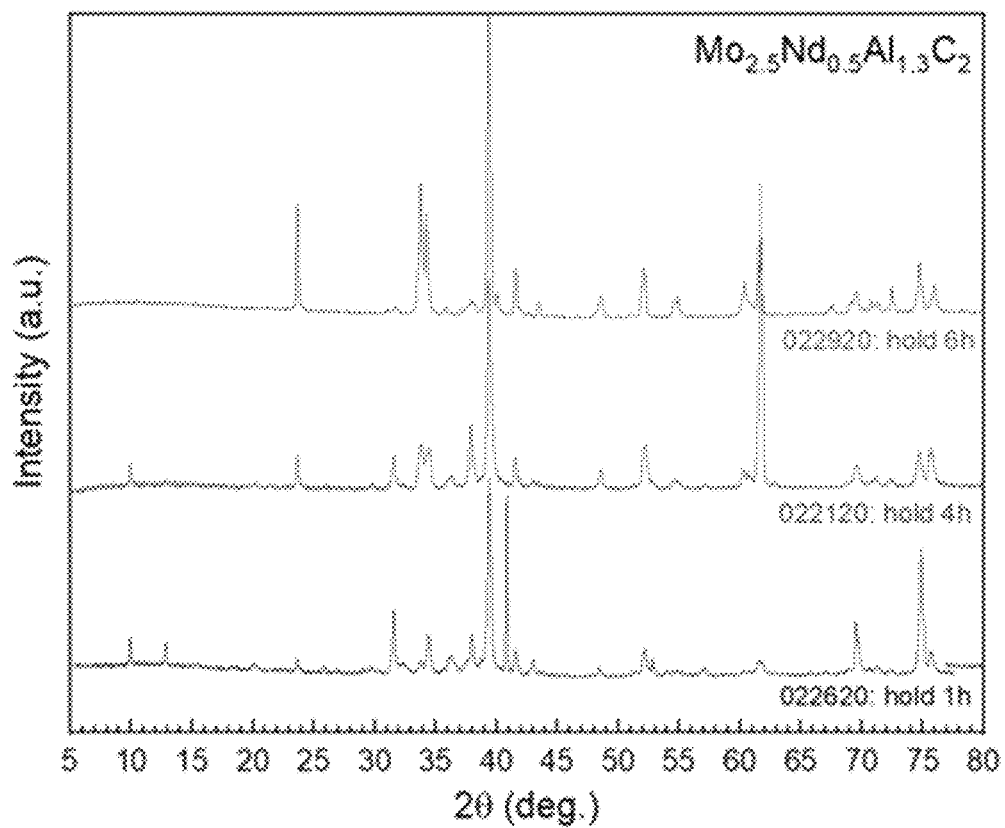
FIG. 4 shows XRD patterns of $Mo_{2+v}Nd_{1-v}AlC_2$ carbides synthesized with varying sintering hold time, in accordance with embodiments of the disclosure.

FIG. 3 shows reactive sintering of variants of $Mo_{2+y}Nd_{1-y}AlC_2$ MAX carbides with different Mo:Nd ratios, all prepared at reactive sintering temperature of 1600° C. at 3.5° C./min ramp rate with a hold time of 4 hour under Argon atmosphere. FIG. 4 shows reactive sintering of $Mo_{2.5}Nd_{0.5}Al_{1.3}C_2$ at different hold time, from 1 hour to 6 hour.

It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof. Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A composition of matter selected from $Mo_2NdC_2$ and $Mo_{2.5}Nd_{0.5}C_2$.

2. The composition of claim 1, wherein the composition is produced by at least:
   preparing precursor MAX phase powder;
   etching the MAX phase powder to obtain multi-layered MXene powder; and
   delaminating the multi-layered MXene powder to obtain single-to-few-layered MXene flakes comprising the composition of matter.

3. The composition of claim 2, wherein preparing precursor MAX phase powder includes mixing and reactive sintering elemental powders of Mo and Nd with Al in a stoichiometric ratio of Mo:Nd:Al:C of 2.5:0.5:1.1:2 to obtain one or more sintered MAX phase blocks.

4. The composition of claim 3, wherein preparing precursor MAX phase powder further includes milling the one or more sintered MAX phase blocks to obtain the MAX phase powder.

5. The composition of claim 2, wherein etching the MAX phase powder includes adding the MAX phase powder into an aqueous hydrofluoric acid to selectively etch away Al to obtain multi-layered MXene powder.

6. The composition of claim 2, wherein delaminating the multi-layered MXene powder includes delaminating the multi-layered MXene powder using tetramethylammonium hydroxide (TMAOH).

7. The composition of claim 6, wherein delaminating the multi-layered MXene powder further includes filtering MXene from TMAOH to obtain the single-to-few-layered MXene flakes.

8. A method of producing a composition of matter selected from $Mo_2NdC_2$ and $Mo_{2.5}Nd_{0.5}C_2$, the method comprising:
   preparing precursor MAX phase powder;
   etching the MAX phase powder to obtain multi-layered MXene powder; and
   delaminating the multi-layered MXene powder to obtain single-to-few-layered MXene flakes comprising the composition of matter.

9. The method of claim 8, wherein preparing precursor MAX phase powder includes mixing and reactive sintering elemental powders of Mo and Nd with Al in a stoichiometric ratio of Mo:Nd:Al:C of 2.5:0.5:1.1:2 to obtain one or more sintered MAX phase blocks.

10. The method of claim 9, wherein preparing precursor MAX phase powder further includes milling the one or more sintered MAX phase blocks to obtain the MAX phase powder.

11. The method of claim 8, wherein etching the MAX phase powder includes adding the MAX phase powder into an aqueous hydrofluoric acid to selectively etch away Al to obtain multi-layered MXene powder.

12. The method of claim 8, wherein delaminating the multi-layered MXene powder includes delaminating the multi-layered MXene powder using tetramethylammonium hydroxide (TMAOH).

* * * * *